(12) United States Patent
Huang

(10) Patent No.: US 9,350,046 B2
(45) Date of Patent: May 24, 2016

(54) PHYSICALLY CROSS-LINKED GEL ELECTROLYTE

(75) Inventor: Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 866 days.

(21) Appl. No.: 13/551,956

(22) Filed: Jul. 18, 2012

(65) Prior Publication Data
US 2014/0023931 A1    Jan. 23, 2014

(51) Int. Cl.
*H01M 10/0565* (2010.01)
*H01M 10/0525* (2010.01)

(52) U.S. Cl.
CPC ...... *H01M 10/0525* (2013.01); *H01M 10/0565* (2013.01); *H01M 2300/0085* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 6,025,437 A * | 2/2000 | Hirahara et al. | 525/89 |
| 2012/0189910 A1* | 7/2012 | Brune et al. | 429/189 |

FOREIGN PATENT DOCUMENTS

| | | | |
|---|---|---|---|
| CN | 102055610 | * | 4/2011 |
| JP | 9-92328 | * | 4/1997 |
| JP | 3879140 B2 | * | 2/2007 |

OTHER PUBLICATIONS

Jannasch, P., "Physically crosslinked gel electrolytes based on a self-assembling ABA triblock copolymer," Polymer 43 (2002) 6449-6453.*

Zoppi, R.A., et al. "Solid Electrolytes based on poly(amide 6-b-ethylene oxide)," Solid State Ionics 91 (1996), 123-130.*

* cited by examiner

*Primary Examiner* — Jonathan Crepeau
(74) *Attorney, Agent, or Firm* — Reising Ethington P.C.

(57) ABSTRACT

An electrochemical battery cell of a lithium ion battery has a physically cross-linked gel electrolyte situated between a negative electrode and a positive electrode. The gel electrolyte includes a block co-polymer host and a liquid electrolyte, which can transport lithium ions, absorbed into the block co-polymer host. The block co-polymer host includes poly (alkylene oxide) block units and physically cross-linkable block units. A few preferred physically cross-linkable block units that may be employed include polyamide block units and poly(terephthalate)ester block units.

20 Claims, 1 Drawing Sheet

PHYSICALLY CROSS-LINKED GEL ELECTROLYTE

TECHNICAL FIELD

The technical field of this disclosure relates generally to a gel electrolyte (sometimes referred to as a gel-polymer electrolyte) for use in an electrochemical battery cell of a lithium-ion battery.

BACKGROUND

A secondary lithium ion battery generally contains one or more electrochemical battery cells. Each cell typically includes a negative electrode, a positive electrode, and an intervening membrane that permits an electric current to be reversibly passed between the negative and positive electrodes through an external circuit. To function in this manner, the membrane is designed to physically separate and electrically insulate the confronting faces of the two electrodes—which prevents a short-circuit in the cell—and to exhibit lithium ion conductivity so that lithium ions can migrate between the electrodes and electrochemically balance the external electric current. The membrane may be rendered ionically (e.g., lithium ion) conductive by the presence of an electrolyte. And several different kinds of membranes that can provide a suitable ionic conductivity have been developed.

One type of lithium ion conductive membrane that may be employed is a gel electrolyte. A gel electrolyte generally comprises a polymer host and a liquid electrolyte conducive to lithium ion mobility absorbed (or plasticized) into the polymer host. This type of membrane is different from other types of membranes such as, for instance, a solid polymer electrolyte that includes an ionically-conducting salt integrated into a relatively high-molecular weight polymer, and a porous polymer separator soaked with (but not plasticized to form a gelatinous structure) a liquid electrolyte. Many of the gel electrolytes that are commonly used today include a homopolymer host plasticized with a compatible liquid electrolyte that includes a solvent and a lithium-based salt. The specific homopolymer usually employed is one of poly(ethylene oxide) (PEO), poly(acrylonitrile) (PAN), poly(methyl methacrylate) (PMMA), or poly(vinylidene fluoride) (PVdF).

A gel electrolyte may be used in an electrochemical battery cell of a lithium ion battery for a variety of reasons. A few specific reasons include the ability to conduct lithium ions without the use of a free liquid electrolyte, the relatively simple packaging requirements, and the flexibility to be fashioned into many different electrochemical battery cell configurations, among others. But the conventional homopolymer-based gel electrolytes used today also have some limitations that need to be considered. In particular, they can suffer thermodynamic and mechanical property declines in response to modest upward fluctuations in cell temperature. A possible explanation for this behavior is the viscosity of a homopolymer-based gel electrolyte may decrease with rising temperatures and, additionally, the solvent used to make the liquid electrolyte may begin to dissolve the homopolymer host. These and other performance-related issues have made the development of a more operationally robust gel electrolyte the subject of ongoing research.

SUMMARY OF THE DISCLOSURE

A physically cross-linked gel electrolyte (sometimes referred to as "gel electrolyte") for use in an electrochemical battery cell of a lithium ion battery may include a block co-polymer host and a compatible liquid electrolyte—which can transport lithium ions—absorbed into the block co-polymer host. The term "physically cross-linked" and its grammatical derivations broadly refer to molecular interactions of the non-chemically bonded type that occur within the block co-polymer host and constrict polymer chain mobility. Non-chemically bonded molecular interactions of this kind include hydrogen bonding and crystallite formation. Such physical cross-links impart robust electrochemical, thermodynamic, and mechanical properties to the block co-polymer host and, by extension, the gel electrolyte. They are not so permanent, however, as is often the case with chemical cross-links, that manufacture of the block co-polymer host into its desired form is exceedingly difficult. Conventional procedures such as melt extrusion and solution casting may still be used to fabricate the block co-polymer host as desired—usually into a thin and relatively flat film—before being activated with the liquid electrolyte.

The block co-polymer host includes poly(alkylene oxide) block units and physically cross-linkable block units. The poly(alkylene oxide) block units establish relatively soft and flexible domains and the physically cross-linkable block units interact with one another to establish relatively hard and rigid domains. These integrated domains provide the block co-polymer host with different functional features that, together, make the block co-polymer host a desirable candidate for making the gel electrolyte. More specifically, the soft domains have a greater affinity for liquid electrolyte absorption, which facilitates formation of the gel electrolyte, and the hard domains render the block co-polymer host more heat-resistant, more mechanically durable, and less dissolvable by the solvent contained in the liquid electrolyte at cell operating temperatures, which makes the gel electrolyte more operationally stable. Preferred physically cross-linkable block units that establish hard domains within the block co-polymer host are polyamide block units or poly(terephthalate)ester block units.

The gel electrolyte may be situated between confronting faces of a negative electrode and a positive electrode in an electrochemical battery cell of a lithium ion battery. The negative and positive electrodes may be formed of materials that can reversibly exchange lithium ions during cycling of the battery between a discharge phase (spontaneous oxidation of an intercalated lithium species at the negative electrode) and a charge phase (oxidation of an intercalated lithium species at the positive electrode by the application of an external voltage). These lithium ions are transported across the gel electrolyte, and between the electrodes, by the gel phase formed primarily at the soft domains and established by the poly(alkylene oxide) block units. The hard domains established by the physically cross-linkable block units do not contribute as much lithium ion conductivity as that of the soft domains; rather, they primarily support the structural and operational integrity of the gel electrolyte over many battery cycles. Any type of the lithium ion battery configuration may incorporate the gel electrolyte including a wound configuration and a prismatic configuration.

DETAILED DESCRIPTION

Figure 1:
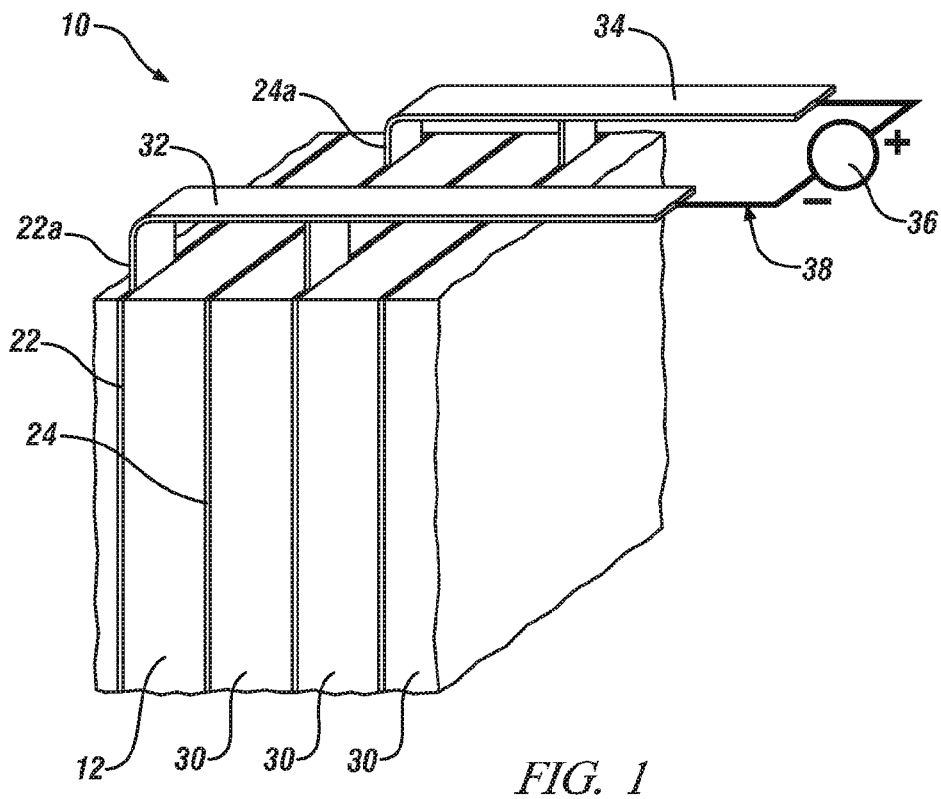
FIG. 1 is a partial perspective view of a generalized lithium ion battery that, according to one embodiment, includes a plurality of electrochemical battery cells stacked into a prismatic configuration.
Figure 2:
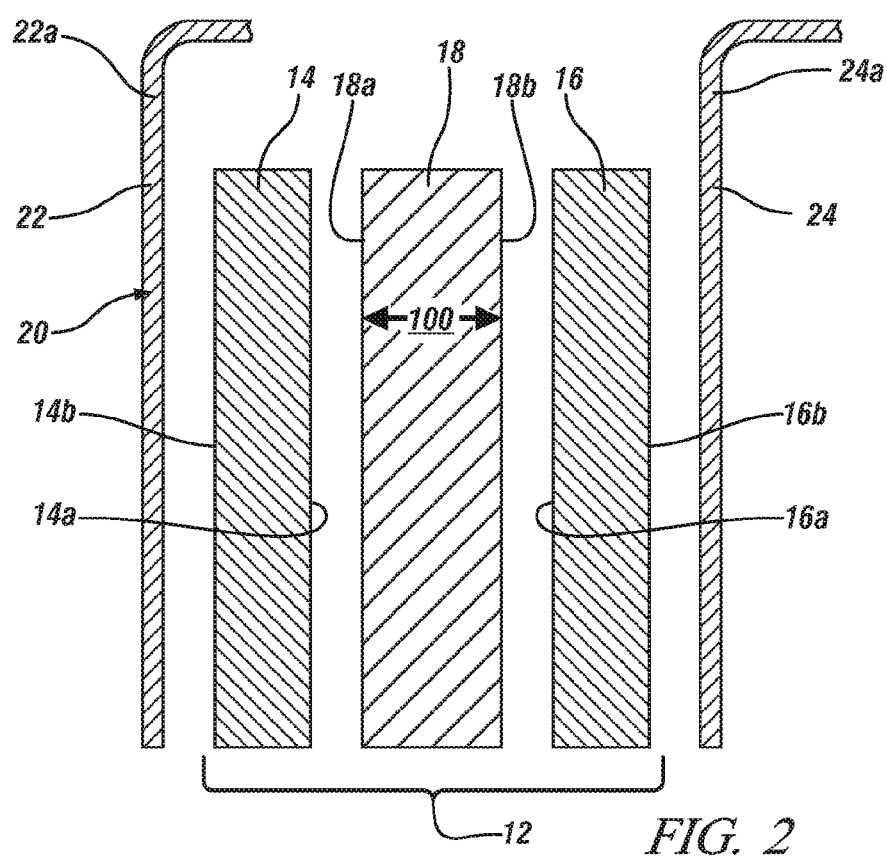
FIG. 2 is a cross-sectional view of one of the electrochemical battery cells included in the lithium ion battery shown in FIG. 1 along with its associated metallic current collectors.

A lithium ion battery 10 may comprise an electrochemical battery cell 12 that includes a negative electrode 14, a positive electrode 16, and a physically cross-linked gel electrolyte 18, as depicted in FIGS. 1-2. The negative electrode 14 includes a negative-side inner face 14a and the positive electrode 16 includes a positive-side inner face 16a. These inner faces 14a, 16a—which may or may not have equivalent surface areas—are spaced apart and confront one another. And situated between the negative-side inner face 14a and the positive-side inner face 16a is the physically cross-linked gel electrolyte 18. The gel electrolyte 18 includes first and second opposed major faces 18a, 18b that define its thickness 100 which, in a preferred embodiment, lies between about 5 μm and about 200 μm, more preferably between about 10 μm and 100 μm. Each of the first and second opposed major faces 18a, 18b preferably engages their respective electrode inner face 14a, 16a over an appreciable surface area. This helps the gel electrolyte 18 physically separate and electrically insulate the electrodes 14, 16, so that a short circuit can be prevented, and provides sufficient contacting interfaces to accommodate lithium ion mobility between the electrodes 14, 16.

The negative electrode 14 is preferably constructed from a lithium host material such as, for example, graphite, silicon, or lithium titanate. The lithium host material may be intermingled with a polymeric binder material to provide the negative electrode 14 with structural integrity and, optionally, a conductive fine particle diluent. The lithium host material is preferably graphite and the polymeric binder material is preferably one or more of polyvinyldiene fluoride (PVdF), an ethylene propylene diene monomer (EPDM) rubber, styrene butadiene rubber (SBR), a carboxymethoxy cellulose (CMC), polyacrylic acid, or mixtures thereof. Graphite is normally used to make the negative electrode 14 because, on top of being relatively inert, its layered structure exhibits favorable lithium intercalation and deintercalation characteristics which help provide the electrochemical battery cell 12 with a suitable energy density. Commercial forms of graphite that may be used to construct the negative electrode 14 are available from Timcal Graphite and Carbon (headquartered in Bodio, Switzerland), Lonza Group (headquartered in Basel, Switzerland), and Superior Graphite (headquartered in Chicago, Ill.). The conductive diluent may be very fine particles of, for example, high-surface area carbon black.

A positive electrode 16 is preferably constructed from a lithium-based active material that stores intercalated lithium at a higher electrochemical potential (relative to a common reference electrode) than the lithium host material used to make the negative electrode 14. The same polymeric binder materials (PVdF, EPDM, SBR, CMC, polyacrylic acid) and conductive fine particle diluent (high-surface area carbon black) that may be used to construct the negative electrode 14 may also be intermingled with the lithium-based active material for the same purposes. The lithium-based active material is preferably a layered lithium transition metal oxide, such as lithium cobalt oxide ($LiCoO_2$), a spinel lithium transition metal oxide, such as spinel lithium manganese oxide ($LiMn_2O_4$), a lithium polyanion, such as a nickel-manganese-cobalt oxide [$Li(Ni_xMn_yCo_z)O_2$], lithium iron phosphate ($LiFePO_4$), or lithium fluorophosphate ($Li_2FePO_4F$). Some other suitable lithium-based active materials that may be employed as the lithium-based active material include lithium nickel oxide ($LiNiO_2$), lithium aluminum manganese oxide ($Li_xAl_yMn_{1-y}O_2$), and lithium vanadium oxide ($LiV_2O_5$), to name but a few alternatives. Mixtures that include one or more of these recited lithium-based active materials may also be used to make the positive electrode 16.

The physically cross-linked gel electrolyte 18 includes a block co-polymer host and a compatible liquid electrolyte—which can transport lithium ions—absorbed into the block co-polymer host. The physical cross-links present in the gel electrolyte 18 are preferably attributed to hydrogen bonding or crystallite formation that materialize within the block co-polymer host between polymer chains. Such physical cross-links provide the block co-polymer host with enhanced electrochemical, thermodynamic, and mechanical properties, as compared to a homopolymer host that lacks physical cross-linking. The enhanced properties of the block co-polymer host, in turn, provide the gel electrolyte 18 with consistent operational stability over a wide temperature operating window. And perhaps just as noteworthy is the fact that physical cross-links do not restrict manufacture and processing of block co-polymer host in same way as chemical cross-links. For example, before being plasticized with the liquid electrolyte, the block co-polymer host can be melted or dissolved into an appropriate solvent at a temperature above the operating temperature range the gel electrolyte is expected to endure. This processing flexibility permits the block co-polymer host to be fabricated into a thin film by melt extrusion, solution casting, or any other suitable forming procedure.

The block co-polymer host includes poly(alkylene oxide) block units and physically cross-linkable block units. The thermodynamic incompatibility of these two block units furnishes the block co-polymer host with a two-phase morphology; that is, the poly(alkylene oxide) block units establish relatively soft and flexible domains, and the physically cross-linkable block units interact with one another to establish relatively hard and rigid domains. The soft and hard domains established by the block units complement one another and, together, provide the block co-polymer host with a desirable balance of liquid electrolyte absorbability and various performance-related properties. More specifically, the soft domains are more apt to absorb the liquid electrolyte and facilitate formation the gel electrolyte 18, while the hard domains render the block co-polymer host more heat-resistant, more mechanically durable, and less dissolvable by the solvent contained in the liquid electrolyte at cell operating temperatures. Some physically cross-linkable block units that can establish hard domains within the block co-polymer host are polyamide block units, a poly(terephthalate)ester block units, or some other type of block units that can participate in physical cross-linking.

The poly(alkylene oxide) block units, generally shown below, include repeating alkylene oxide structural units and are derived from the polymerization of suitable precursor monomers or pre-polymers with x representing the number of carbon atoms—preferably from 1 to 6—and n representing the number of alkylene oxide structural units in each poly (alkylene oxide) block unit—preferably from about 6 to about 5000:

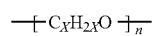

This general structure of the poly(alkylene oxide) block units encompasses linear and branched structures. A branched structure, for example, is shown below in which d represents the number of main chain carbon atoms and preferably ranges from 1 to 5, w represents the number of pendent chain carbon atoms and preferably ranges from 1 to 5, and the sum of d and w preferably ranges from 2 to 6 (that is, d+w in the branched structure is equal to x in the general structure when x is at least 2):

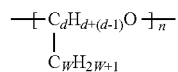

The physically cross-linkable block units are preferably polyamide block units—which include repeating amide structural units derived from suitable monomers or pre-polymers—or poly(terephthalate)ester block units—which include repeating terephthalate ester structural units derived from suitable monomers or pre-polymers. The polyamide block units may be any type including, but not limited to, those shown below in which R, $R_1$, and $R_2$ represent the same or different alkylene bridges and m represents the number of amide structural units in each polyamide block unit—preferably from about 6 to about 5000.

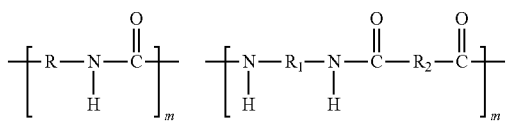

The poly(terephthalate)ester block units may be any type including, but not limited to, the one shown below in which $R_3$ represents an alkylene bridge and y represents the number of terephthalate ester structural units in each poly(terephthalate)ester block unit—preferably from about 6 to about 5000.

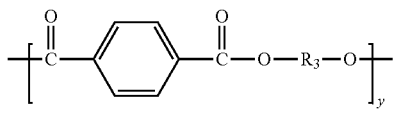

The number of poly(alkylene oxide) block units and physically cross-linkable block units that are linked together to form individual block co-polymer molecules of the block co-polymer host is chosen so that the block co-polymer host achieves the intended balance of liquid electrolyte absorbability (by way of the soft domains) and operational stability within the construct of the electrochemical battery cell 12 (by way of the hard domains). The extent of such block co-polymerization can be determined through experience, modeling, experimentation, or some other approach. For example, in a preferred embodiment, the block co-polymer host is prepared with a number average molecular weight ($M_N$) that ranges from about 100,000 to about 400,000 when each of the poly(alkylene oxide) block units and the physically cross-linkable block units falls within the relevant structural unit numbers mentioned above (i.e., n, m, y). But of course, as will be appreciated by skilled artisans, the block co-polymer host can realize an operative balance between liquid electrolyte absorbability and operational stability when prepared with a number average molecular weight outside of this preferred range.

A block co-polymer host that includes poly(alkylene oxide) block units and polyamide block units may have the chemical formula shown below, in which R is an alkylene bridge having 1 to 16 carbons, x ranges from 1 to 6, m (the number of amide structural units in each polyamide block unit) ranges from 6 to 5000, and n (the number of alkylene oxide structural units in each poly(alkylene) oxide block unit) ranges from 6 to 5000:

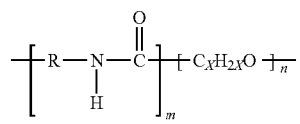

Physical cross-links can be formed within such a block co-polymer host by way of hydrogen bonding that occurs between the amine hydrogen (—H) and the carbonyl oxygen (═O) of nearby amide structural units. A poly(amide-b-alkylene oxide) block co-polymer host of this type may be manufactured by conventional block co-polymerization techniques such as, for example, the esterification of (1) carboxylic acid-terminated aliphatic amide prepolymer blocks and (2) polyether diol prepolymer blocks. It may also be obtained from commercial sources such as Arkema (US headquarters in King of Prussia, Pa.) under the trade designation Pebax®.

A specific and preferred poly(amide-b-alkylene oxide) block co-polymer host that may be used to make the gel electrolyte 18 includes poly(ethylene oxide) block units and poly(caprolactam) (i.e., nylon 6) block units, as shown by the chemical formula below:

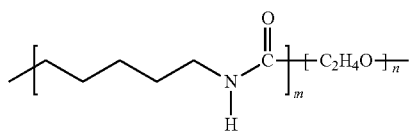

A block co-polymer host that includes poly(alkylene oxide) block units and poly(terephthalate)ester block units may have the chemical formula shown below, in which $R_3$ is an alkylene bridge having between 2 and 16 carbons, y (the number of terephthalate ester structural units in each poly(terephthalate)ester block unit) ranges from 6 to 5000, and n (the number of alkylene oxide structural units in each poly(alkylene) oxide block unit) ranges from 6 to 3000:

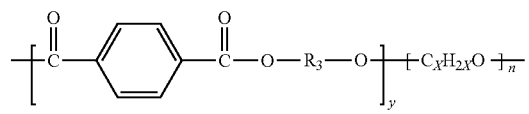

Physical cross-links can be formed within such a block co-polymer host by way of crystallite formation that occurs between nearby terephthalate ester block units. These crystallites, or lamellae, are formed when the terephthalate ester structural units of the same block unit or different block units align themselves and fold back on one another in generally ordered fashion. A poly(terephthalate ester-b-alkylene oxide) block co-polymer host of this type may be manufactured by conventional block co-polymerization techniques. It may also be obtained from commercial sources such as DuPont (World headquarters in Wilmington, Del.) under the trade designation Hytrel®.

A specific and preferred poly(terephthalate ester-b-alkylene oxide) block co-polymer host that may be used to make the gel electrolyte 18 includes poly(ethylene oxide) block units and poly(ethylene terephthalate) block units or poly (butylene terephthalate) block units, as shown by the chemical formulas below:

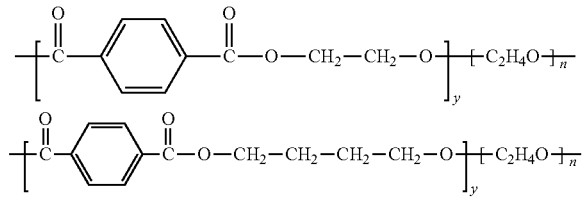

The liquid electrolyte absorbed (or plasticized) into the block co-polymer host preferably includes a lithium salt and an organic solvent. Some suitable lithium salts that may be used to make the liquid electrolyte include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The organic solvent in which the lithium salt may be dissolved is preferably a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents. The concentration of the lithium salt in the organic solvent may be any appropriate concentration that achieves sufficient lithium ion conduction through the gel electrolyte 18—typically, for example, about 0.5 molar to about 2.0 molar. A few preferred liquid electrolytes that may be used with the poly(amide-b-alkylene oxide) block co-polymer host and the poly(terephthalate ester-b-alkylene oxide) block co-polymer host, respectively, are $LiClO_4$ dissolved in a mixture of ethylene carbonate and dimethyl carbonate or a mixture of ethylene carbonate, diethyl carbonate, and polypropylene carbonate, and $LiPF_6$ dissolved in a mixture of ethylene carbonate and dimethyl carbonate or a mixture of ethylene carbonate, diethyl carbonate, and propylene carbonate.

The liquid electrolyte may be absorbed into the block co-polymer host to form the gel electrolyte 18 by any known technique. For example, in one embodiment, the block co-polymer host may be soaked in a bath of the liquid electrolyte. The block co-polymer host may be soaked until it becomes saturated, and then it may be removed from the liquid electrolyte bath. In another embodiment, the lithium salt and the organic solvent may be separately introduced into the block co-polymer host. This may entail dispersing the lithium salt throughout a polymer solution that is subsequently extruded, cast, or otherwise fabricated into the block co-polymer host, followed by soaking the host—which now includes an internal dissemination of the lithium salt—in a bath of the organic solvent or a dilute liquid electrolyte until it becomes saturated. Exactly which technique is used to plasticize the block co-polymer host depends on several variables including the reactivity of the lithium salt, the composition of the block co-polymer host, and the particular procedure used to fabricate the host into its intended size and shape. Of course other suitable techniques not specifically mentioned here may also be practiced.

Other materials may also be included in the gel electrolyte 18 besides the block co-polymer host and the absorbed liquid electrolyte, if desired. One such material is poly(alkylene oxide) that is physically blended with the block co-polymer host. This additional poly(alkylene oxide) is not part of the chemical structure of the block co-polymer host and, as such, is separate from the poly(alkylene oxide) component of the block co-polymer host, although it may participate in liquid electrolyte absorption in the same general way. Physically blending additional poly(alkylene oxide)—preferably poly (ethylene oxide)—with the block co-polymer host provides the host with better liquid electrolyte absorbability. The physically blended poly(alkylene oxide) may be included in the gel electrolyte 18 in an amount that ranges from about 20 wt. % to about 80 wt. % of the total weight of the block co-polymer host and the additional poly(alkylene oxide).

Another material that may be included in the gel electrolyte 18 is particles that are comprised of a ceramic material or a polymer material. These types of particles may be dispersed throughout the block co-polymer host to supplement the thermal stability and compressive strength of the gel electrolyte 18. The size of the particles may range from about 0.005 μm to about 15 μm and, more preferably, from about 0.05 μm to about 3 μm. Forming the particles out of a ceramic material is most preferred since ceramics are typically quite heat-resistance, wettable by lithium ion battery electrolytes, and electrochemically stable within the operating environment of an electrochemical battery cell of a lithium ion battery. Some examples of suitable ceramic materials include alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, and mixtures thereof. Of these various suitable ceramic materials, however, alumina, silica, and ceria are favored because, on balance, they perform adequately and are generally widely available through numerous commercial sources at low relative cost.

The polymer materials that may be employed to make the particles include a cross-linked thermoset polymer and an engineering thermoplastic polymer. Some examples of suitable cross-linked thermoset polymer materials include the cured forms of a polyimide, a polyurethane, a phenol-formaldehyde resin, a melamine-formaldehyde resin, an epoxy resin, and mixtures thereof. Some examples of suitable engineering thermoplastic polymers include those of a polyolefin, a polyimide, a polyamide, a polysulfone, a polyester, a fluoropolymer, a polyacrylate, an acrylic, a polycarbonate, a polyurethane, a polyketone, and mixtures thereof. Specific and exemplary polymer materials encompassed by these polymer material families include polypropylene, polyethylene, polyetherimide, polyhexamethylene adipamide (nylon 6,6), polycaprolactam (nylon 6), an aromatic polyamide such as polyparaphenylene terephthalamide (i.e., Kevlar®), standard polysulfone, polyarylsulfone, polyethersulfone, polyphenylsulfone, a polyester such as polyethylene terephthalate, a liquid crystal polymer such as the polycondensation product of 4-hydroxybenzoic acid and 6-hydroxynaphthalene-2-carboxylic acid (i.e., Vectran®), polyvinylidene fluoride, poly(methyl methacrylate), polyacrylonitrile, poly (bisphenol A-carbonate), polyether- and polyester-based polyurethanes, polyether ketone (PEK), polyether ether ketone (PEEK), polyarylether ketone (PAEK), ethylene-vinyl acetate, and mixtures thereof. Of course other types of polymer materials not specifically listed above may also be used to fabricate the particles as is generally understood by skilled artisans.

The electrochemical battery cell 12 is preferably bracketed by a pair of metallic current collectors 20 to help pass an electric current between the two electrodes 14, 16. More specifically, a negative-side metallic current collector 22 supports a negative-side outer face 14b of the negative electrode 14, and a positive-side metallic current collector 24 supports a positive-side outer face 16b of the positive electrode 16. Each of the metallic current collectors 22, 24 are preferably thin and flexible metallic foils that engage their respective electrode outer faces 14b, 16b over an appreciable interfacial surface area, as shown, to facilitate the efficient collection and distribution of free electrons. They may also include tabs 22a, 24a for accommodating an electrical connection. Any of a wide variety of electrically conductive metals may be employed to construct the metallic current collectors 22, 24. In a preferred embodiment, however, the negative-side metallic current collector 22 is a copper foil and the positive-side metallic current collector 24 is an aluminum foil.

The electrochemical battery cell 12 and the metallic current collectors 20 are generally thin and flexible when put together. A typical thickness of the electrochemical battery cell 12 extending from the negative-side outer face 14b to the positive-side outer face 16b is about 65 μm to about 500 μm. Each electrode 14, 16 is preferably about 30 μm to 150 μm thick and, as already mentioned, the gel electrolyte 18 is about 5 μm to 200 μm thick. The metallic current collectors 20 are normally about 5 μm to 20 μm thick. The relatively thin and flexible nature of the electrochemical battery cell 12 and its associated metallic current collectors 20 allows them to be rolled, folded, bent, or otherwise maneuvered into a variety of lithium ion battery configurations depending on design specifications and spatial constraints. The electrochemical battery cell 12 and metallic current collectors 20 may be designed and constructed so that the lithium ion battery 10 assumes, for example, a prismatic configuration as shown in FIG. 1. But of course other lithium ion battery configurations may also be practiced despite not being shown in the Figures.

Additional electrochemical battery cells, which are generally referred to as numeral 30, and associated metallic current collectors 20 may also be included in the lithium ion battery 10. These additional cells 30 may include the physically cross-linked gel electrolyte 18, if desired, or they may include some other type of lithium ion conducting membrane. Anywhere from five to fifty of the electrochemical battery cells 12, 30 are typically connected in parallel—although a series connection is also permitted—to form the lithium ion battery 10. Several of the lithium ion batteries 10 may then be connected in series or in parallel to assemble a lithium ion battery pack (not shown) with the voltage and current capacity demanded for a particular application. For instance, anywhere from twenty to two hundred and fifty of the lithium ion batteries 10 are often included in a lithium ion battery pack if the battery pack is intended to be used—either alone or in combination with other lithium ion battery packs—as an on-board power source in a hybrid-electric vehicle (HEV), an extended range electric vehicle (EREV), or some other similar vehicle. While the electrochemical battery cells 12, 30 incorporated into the lithium ion battery 10 shown in FIG. 1 are rectangularly-shaped and stacked side-by-side in a prismatic configuration, skilled artisans will appreciated that the lithium ion battery 10 could just as easily assume a wound configuration if so desired.

The negative electrodes 14 and the positive electrodes 16 of the several electrochemical battery cells 12, 30 may be connected together by a negative terminal 32 and a positive terminal 34, respectively. The negative terminal 32 and the positive terminal 34 of the lithium ion battery 10 may, in turn, be connected to an electrical device 36 as part of an interruptible circuit 38. The electrical device 36 may be a wide variety of electrical loads and power-generating devices. An electrical load is a power-consuming device that is powered fully or partially by the lithium ion battery 10. Conversely, a power-generating device is one that charges or re-powers the lithium ion battery 10 through an applied external voltage. The electrical load and the power-generating device can be the same device in some instances. For example, the electrical device 36 may be an electric motor for a HEV or an EREV that is designed to draw an electric current from the lithium ion battery 10 during acceleration and provide a regenerative electric current to the lithium ion battery 10 during deceleration. The electrical load and the power-generating device can also be different devices. For example, the electrical load may be an electric motor for a HEV or an EREV and the power-generating device may be an AC wall outlet, an internal combustion engine, and/or a vehicle alternator.

The lithium ion battery 10 can provide a useful electrical current to the electrical device 36. An electrical current can be produced by way of reversible electrochemical reactions that occur in the electrochemical battery cells 10, 30 when the interruptible circuit 38 is closed to connect the negative terminal 32 and the positive terminal 34 at a time when the negative electrodes 14 contain intercalated lithium (i.e., battery discharge). The electrochemical potential difference between the lithiated negative electrode and the positive electrode in each cell 12, 30—approximately 2.5 to 5V—drives the oxidation of intercalated lithium contained in the negative electrodes 14. Free electrons produced by this oxidation reaction are collected by the negative-side current collectors 22 and are supplied to the negative terminal 32. A flow of free electrons is harnessed and directed through the electrical device 36 from the negative terminal 32 to the positive terminal 34 and eventually to the positive electrodes 16 by way of the positive-side current collectors 24. Lithium ions, which are also produced at the negative electrodes 14, are concurrently carried through the gel electrolyte(s) 18 (at least in cell 12) or other lithium ion conducting membranes (possible in cells 30) in route to the positive electrodes 16 as well. The flow of free electrons through the electrical device 36 from the negative terminal 32 to the positive terminal 34 can be continuously or intermittently provided until the negative electrodes 14 are depleted of intercalated lithium or the capacity of the electrochemical battery cells 12, 30 is otherwise spent.

The lithium ion battery 10 can be charged or re-powered at any time by applying an external voltage to the electrochemical battery cells 12, 30. Application of the external voltages drives the reverse the electrochemical reactions that occur during discharge. The applied external voltage compels the otherwise non-spontaneous oxidation of intercalated lithium contained in the positive electrodes 16 to produce free electrons and lithium ions. The free electrons are collected by the positive-side current collectors 24 and are supplied to the positive terminal 34. A flow of the free electrons is directed to the negative terminal 32, and eventually to the negative electrodes 14, by way of the negative-side current collectors 22. The lithium ions are concurrently carried back through the gel electrolyte(s) 18 (at least in cell 12) or other lithium ion conducting membranes (possible in cells 30) towards the negative electrodes 14 as well. The lithium ions and the free electrons eventually reunite and replenish the negative electrodes 14 with intercalated lithium to prepare the electrochemical battery cells 12, 30 for another discharge phase. The external voltage may originate from the electrical device 36 as previously mentioned or by some other suitable mechanism.

EXAMPLES

Two gel electrolytes were fabricated in accordance with the above disclosure. One gel electrolyte was prepared with a poly(amide-b-alkylene oxide) block co-polymer host and the other gel electrolyte was prepared with poly(terephthalate ester-b-alkylene oxide) block co-polymer host. Each of the fabricated gel electrolytes demonstrated a lithium ion conductivity suitable for used in a lithium ion battery.

A poly(caprolactam-b-ethylene oxide) block co-polymer material was obtained from Arkema under the tradename Pebax® MH 1657 (US headquarters in King of Prussia, Pa.). This particular block co-polymer material contained about 40 wt. % poly(caprolactam) block units and about 60 wt. % poly(ethylene oxide) block units. The poly(caprolactam-b-ethylene oxide) block co-polymer material was dissolved in a 70:30 mixture of ethanol and water (i.e., 70 wt. % ethanol and 30 wt. % water), under reflux at 80° C. with two hours of stirring, to prepare a 3 wt. % Pebax® polymer solution. Some additional poly(ethylene oxide), about 1 part PEO per 1 part Pebax® MH 1657, and about 0.1 parts of $LiClO_4$ per 1 part Pebax® MH 1657 were then added to the polymer solution, followed by casting the solution into a thin film about 25 μm thick after drying. The resultant poly(caprolactam-b-ethylene oxide) block co-polymer host—which also includes physically blended poly(ethylene oxide) and the lithium salt—was soaked in 0.8 M $LiClO_4$ in a mixture of ethylene carbonate and dimethyl carbonate (mixed 1:1 by volume) for about an hour to make a gel electrolyte.

A poly(ethylene terephthalate-b-ethylene oxide) block co-polymer host was obtained from DuPont under the tradename Hytrel® G5544 (World headquarters in Wilmington, Del.). The poly(ethylene terephthalate-b-ethylene oxide) block co-polymer material was dissolved in m-cresol (3-methylphenol) and mechanically stirred at 50° C. for about 1 hour to prepare a 5 wt. % Hytrel® polymer solution. Some additional poly(ethylene oxide), about 1 part PEO per 1 part Hytrel® G5544, was then added to the polymer solution, followed by casting the solution into a thin film about 25 μm thick after drying. The resultant poly(ethylene terephthalate-b-ethylene oxide) block co-polymer host—which also includes physically blended poly(ethylene oxide)—was soaked in a 1M liquid electrolyte of $LiPF_6$ dissolved in a mixture of ethylene carbonate and dimethyl carbonate (mixed 1:1 by volume) for about an hour to make a gel electrolyte.

It should be noted that, in the two examples just described, the absorption of the liquid electrolyte into the block co-polymer host occurred differently. In the first Example, the lithium salt was present first in the poly(caprolactam-b-ethylene oxide) block co-polymer host and the organic solvent (i.e., the mixture of ethylene carbonate and dimethyl carbonate) was introduced later. Specifically, the $LiClO_4$ was added to the polymer solution from which the poly(caprolactam-b-ethylene oxide) block co-polymer host was derived, and the host then soaked in the organic solvent to effectuate absorption of the liquid electrolyte. In the second example, the lithium salt and the organic solvent (i.e., the mixture of ethylene carbonate and dimethyl carbonate) were introduced into the poly(ethylene terephthalate-b-ethylene oxide) block co-polymer host at the same time. Neither of these techniques are mandatory though. The liquid electrolyte used in each Example could have been absorbed into its respective block co-polymer host by either technique as will be appreciated by skilled artisans.

The above description of preferred exemplary embodiments and related Examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A lithium ion battery that includes at least one electrochemical battery cell that comprises:
   a negative electrode;
   a positive electrode situated opposite the negative electrode; and
   a physically cross-linked gel electrolyte disposed between confronting faces of the negative electrode and the positive electrode, the gel electrolyte comprising a block co-polymer host and a liquid electrolyte absorbed into the block co-polymer host, the block co-polymer host having poly(ethylene oxide) block units and physically cross-linkable block units selected from the group consisting of polyamide block units and poly(terephthalate) ester block units.

2. The electrochemical battery cell set forth in claim 1, wherein the polyamide block units comprise poly(caprolactam) block units.

3. The electrochemical battery cell set forth in claim 1, wherein the poly(terephthalate)ester block units comprise poly(ethylene terephthalate) block units or poly(butylene terephthalate) block units.

4. The electrochemical battery cell set forth in claim 1, wherein the block co-polymer host has the chemical formula:

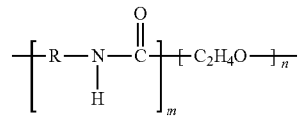

in which R is an alkylene bridge having 1 to 16 carbons, m ranges from 6 to 5000, and n ranges from 6 to 5000.

5. The electrochemical battery cell set forth in claim 4, wherein the block co-polymer host has the chemical formula:

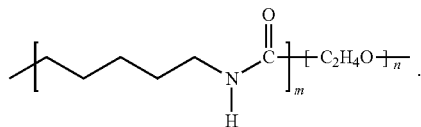

6. The electrochemical battery cell set forth in claim 1, wherein the block co-polymer host has the chemical formula:

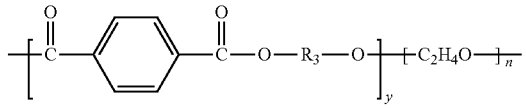

in which $R_3$ is an alkylene bridge having between 2 and 16 carbons, y ranges from 6 to 5000, and n ranges from 6 to 5000.

7. The method set forth in claim 6, wherein the block co-polymer host has the chemical formula:

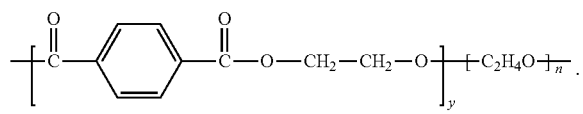

8. The electrochemical battery cell set forth in claim 1, wherein the gel electrolyte has a thickness that ranges from about 5 μm to about 200 μm.

9. The electrochemical battery cell set forth in claim 1, wherein the gel electrolyte further comprises physically blended poly(alkylene oxide).

10. The electrochemical battery cell set forth in claim 1, wherein the gel electrolyte further comprises ceramic particles or polymer particles.

11. The electrochemical battery cell set forth in claim 1, wherein the liquid electrolyte absorbed into the block co-polymer host comprises a lithium salt and an organic solvent.

12. The electrochemical battery cell set forth in claim 11, wherein the lithium salt comprises at least one of $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts.

13. The electrochemical battery cell set forth in claim 11, wherein the organic solvent comprises at least one of a cyclic carbonate, an acyclic carbonate, an aliphatic carboxylic ester, a γ-lactone, an acyclic ether, a cyclic ether, or a mixture that includes one or more of these organic solvents.

14. A lithium ion battery that includes at least one electrochemical battery cell that comprises:
a negative electrode;
a positive electrode situated opposite the negative electrode; and
a physically cross-linked gel electrolyte disposed between confronting faces of the negative electrode and the positive electrode, the gel electrolyte comprising a block co-polymer host, poly(ethylene oxide) physically blended with the block co-polymer host, and a liquid electrolyte absorbed into the block co-polymer host and the physically blended poly(ethylene oxide), the block co-polymer host having one of the following chemical structures:

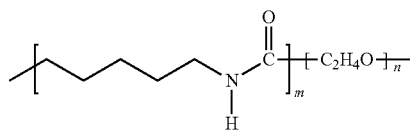

in which m ranges from 6 to 5000 and n ranges from 6 to 5000; or

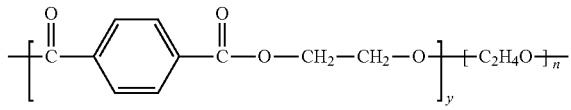

in which y ranges from 6 to 5000 and n ranges from 6 to 5000.

15. The electrochemical battery cell set forth in claim 14, wherein the gel electrolyte has a thickness that ranges about 10 μm to about 100 μm.

16. The electrochemical battery cell set forth in claim 14, wherein the liquid electrolyte comprises a lithium salt and an organic solvent, wherein the lithium salt comprises at least one of $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts, and wherein the organic solvent comprises at least one of a cyclic carbonate, an acyclic carbonate, an aliphatic carboxylic ester, a γ-lactone, an acyclic ether, a cyclic ether, or a mixture that includes one or more of these organic solvents.

17. A physically cross-linked gel electrolyte for use in an electrochemical battery cell of a lithium ion battery, the physically cross-linked gel electrolyte comprising:
a block co-polymer host that comprises poly(alkylene oxide) block units and physically cross-linkable block units, the poly(alkylene oxide) block units establishing soft domains and the physically cross-linkable block units interacting with one another to establish hard domains, and wherein the poly(alkylene oxide) block units have the chemical formula:

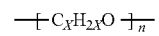

in which x ranges from 1 to 6;
poly(ethylene oxide) physically blended with the block co-polymer host; and
a liquid electrolyte absorbed into the block co-polymer host and the physically blended poly(ethylene oxide), the liquid electrolyte comprising a lithium salt and an organic solvent, wherein the soft domains have a greater affinity for liquid electrolyte absorption than the hard domains.

18. The physically cross-linked gel electrolyte set forth in claim 17, wherein the physically cross-linkable block units are polyamide block units or poly(terephthalate)ester block units.

19. The physically cross-linked gel electrolyte set forth in claim 17, wherein the gel electrolyte includes first and second opposed major faces shaped to engage spaced apart and confronting inner faces of a negative electrode and a positive electrode for an electrochemical battery cell of a lithium ion battery, and wherein the first and second major faces define a thickness of the gel electrolyte that ranges from about 5 μm to about 200 μm.

20. The physically cross-linked gel electrolyte set forth in claim 17, wherein the poly(alkylene oxide) block units have the chemical formula:

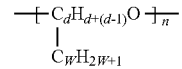

in which the sum of d and w ranges from 2 to 6.

* * * * *